April 21, 1964     R. D. SMITH     3,129,912
SAFETY PARACHUTE FOR AIRCRAFT
Filed Dec. 5, 1962     2 Sheets-Sheet 1
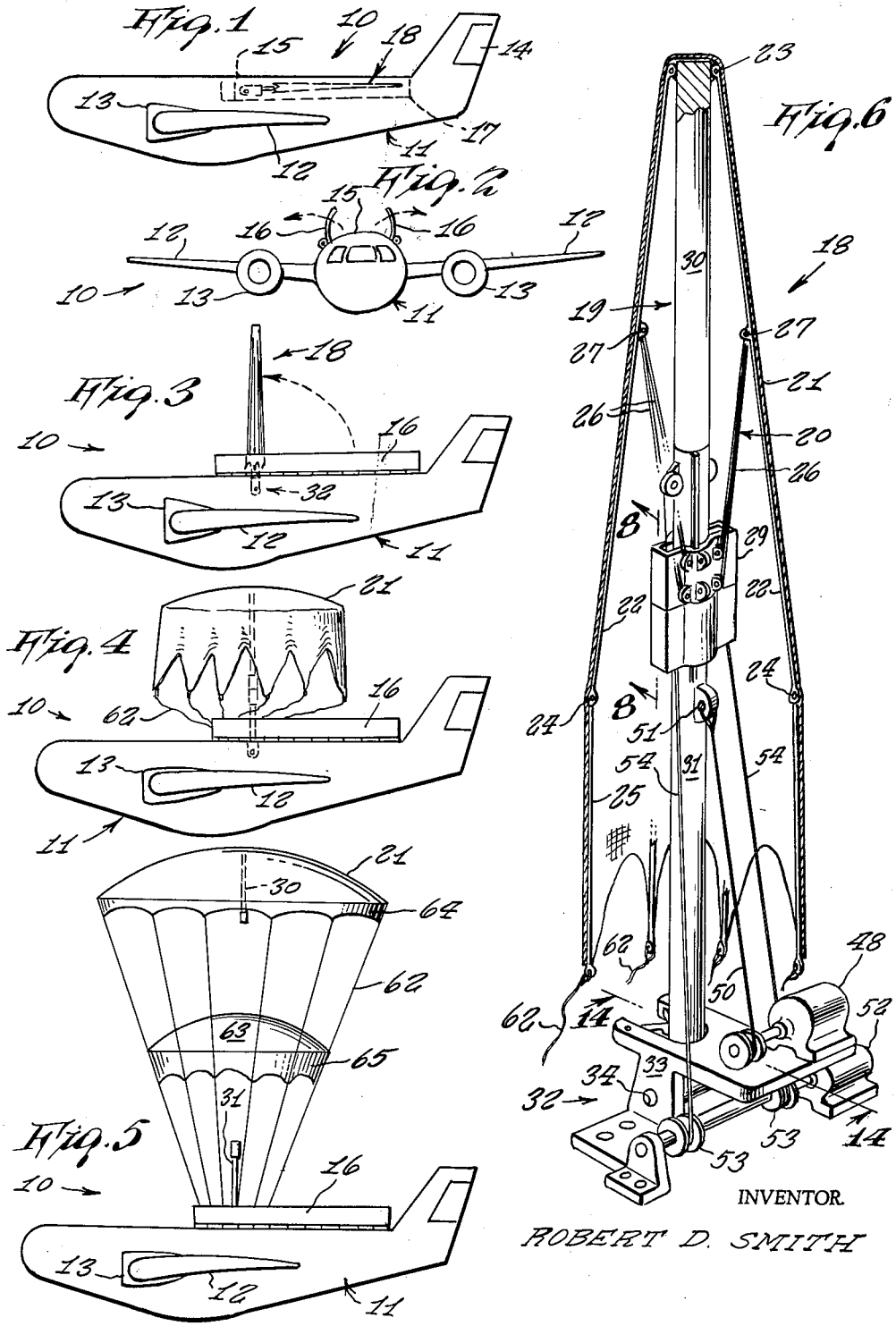
INVENTOR.
ROBERT D. SMITH

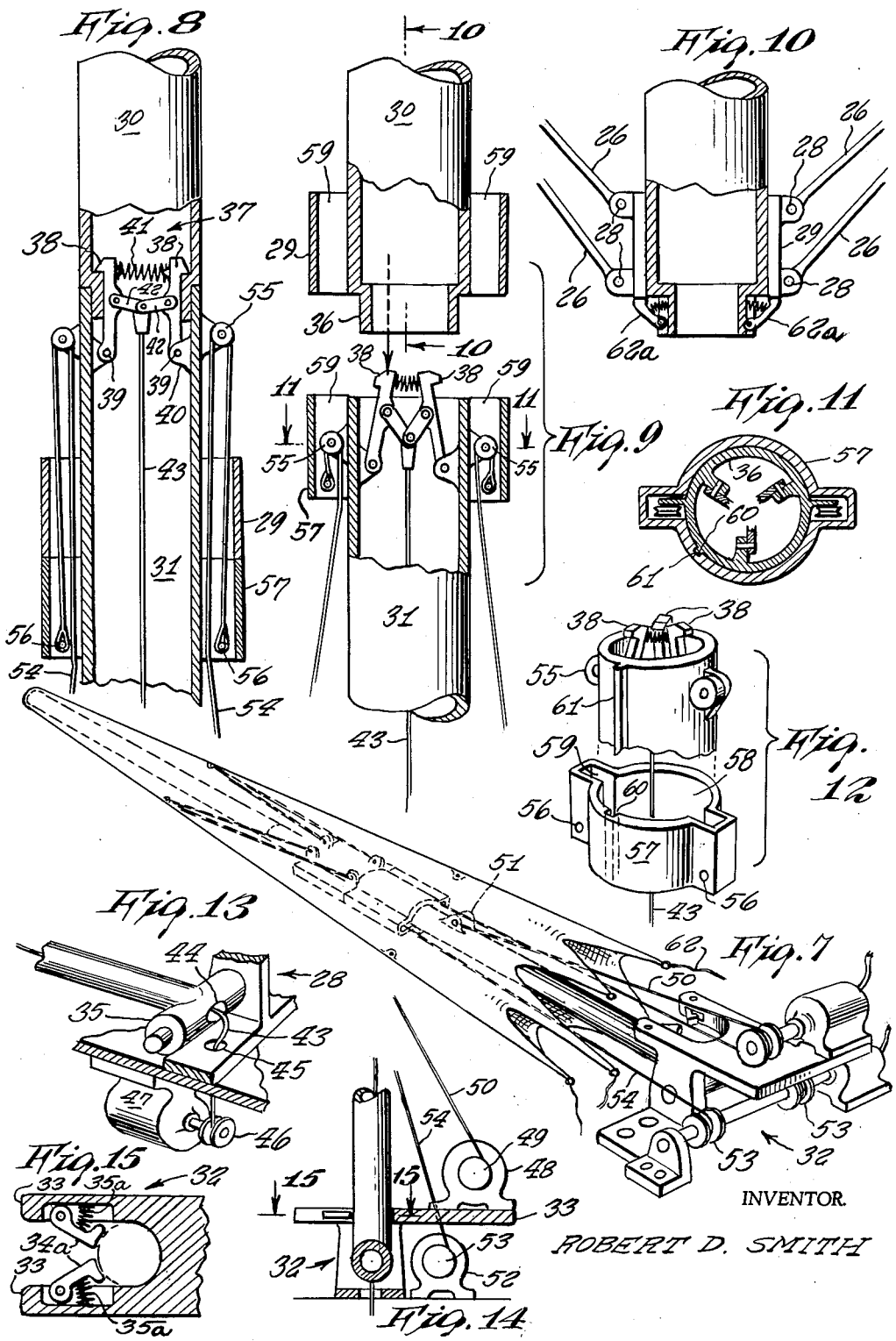

3,129,912
SAFETY PARACHUTE FOR AIRCRAFT
Robert D. Smith, 2742 E. Tremont Ave., Bronx 61, N.Y.
Filed Dec. 5, 1962, Ser. No. 242,384
2 Claims. (Cl. 244—139)

This invention relates generally to safety equipment for airplanes. More particularly it relates to safety parachutes for airplanes.

One object of the present invention is to provide an airplane having a self-contained parachute apparatus which will reduce the rate of descending speed of the craft should the airplane become mechanically disabled and start to fall toward the earth.

Another object of the present invention is to provide an airplane incorporating a parachute apparatus comprising a plurality of canopies in vertical axial alignment relative to each other, and wherein the several canopies will multiply the decrease in rate of falling speed.

Still another object of the present invention is to provide an airplane wherein the parachute apparatus is fully contained within the interior of the airplane when not in emergency use thereby not disrupting the streamlined contour of the aircraft in normal flight.

A further object is to provide an airplane wherein the parachute apparatus can be controlled from within the craft, and which can be quickly released into operative position in case of emergency.

Other objects are to provide a parachute apparatus for aircraft which is compact, easy to operate, and positive in operation; and which will aid in saving of lives and aeronautical equipment in case the aircraft starts to fall toward earth.

These and other objects will become readily apparent upon a study of the following specifications and accompanying drawings wherein:

FIGURE 1 is a side elevation view of an airplane incorporating the present invention, showing the device in inoperative use.

FIGURE 2 is a similar view showing a first step in placing the device into operative position.

FIGURE 3 is a similar view showing a next subsequent step thereto.

FIGURE 4 is a similar view showing a further subsequent step thereto.

FIGURE 5 is a similar view showing a final subsequent step wherein the device is in fully operative position.

FIGURE 6 is an enlarged assembly of the device which comprises the present invention, shown in operative position.

FIGURE 7 is a perspective view similar to FIGURE 6 showing the device in retracted inoperative position.

FIGURE 8 is an enlarged cross sectional view through 8—8 of FIGURE 6.

FIGURE 9 is a view similar to FIGURE 8 showing an alternate position.

FIGURE 10 is a cross sectional view through 10—10 of FIGURE 9.

FIGURE 11 is a cross sectional view through 11—11 of FIGURE 9.

FIGURE 12 is a fragmentary perspective view of part of the structure illustrated in FIGURE 9.

FIGURE 13 is a fragmentary perspective view of certain structure shown in FIGURE 7, shown in a similar position.

FIGURE 14 is a cross sectional view through 14—14 of FIGURE 6, and

FIGURE 15 is a cross sectional view through 15—15 of FIGURE 14.

Referring now to the drawing in detail, the numeral 10 represents an airplane according to the present invention wherein there is a fuselage 11, wings 12, engines 13 and rudder 14.

On the upper side 15 of the craft there are a pair of hinged doors 16 which can be opened by remote control within the craft, and which provide access to a chamber 17 wherein the parachute apparatus 18 is kept in stored condition during normal flight.

The parachute apparatus comprises a shaft 19 which is pivotable about its lower end from a horizontal retracted position to a vertical operative position, the shaft carrying an expandable framework 20 supporting a canopy 21. The framework comprises a plurality of radial rods 22 pivotally attached by their one ends to the top of the shaft as indicated by pivots 23. Each of the rods is provided with a pivot 24 at its opposite end to which a rod extension 25 is attached. Connecting rods 26 are each attached pivotally free at one end to rods 22 by means of pin 27, and at the other end to pin 28 on upper collar 29 which slides on shaft 19.

The shaft is comprised of an upper element 30 and a lower element 31; the upper element carrying the framework and the lower element being attached to a pivot assembly 32.

The pivot assembly comprises a bracket 33 having bearings 34 within which a cross-shaft 35 affixed to the lower end of element 31 is free to pivot. The bracket includes a yoke 32 having spaced apart arms 33 between which the shaft 19 can be moved as shown in FIGURES 6 and 15. A pawl 34a in each arm activated by a spring 35a will prevent return of the shaft after it has entered the space between the arms. The bracket is rigidly mounted to the floor of compartment 17 and several motors each driving a winch are mounted upon or relatively close to the bracket for association with mechanisms to be immediately described.

The shaft upper and lower elements are made from hollow tubes; the upper element having inward flange 36 at its lower end which fits within the upper end of the element 31.

A locking mechanism 37 is mounted within the upper end of element 31; the locking mechanism comprising several hooks 38 pivoted at their lower end on pins 39 fixed in embossments 40 integral with element 31. The hooks clamp over the top of flange 36 thus securely holding the shaft elements together. Spring 41 between the hooks normally urge the hooks in holding position on the flange. An arrangement of links 42 pivoted to the hooks connect to a cable 43 which extends downward through element 31, out of opening 44 in cross-shaft 35 then through opening 45 in bracket 33 and the compartment floor to a winch 46 driven by a motor 47.

Another motor 48, mounted on bracket 33, drives a winch 49 from which a cable 50 extends to a cleat 51 mounted on the outer side of element 31.

Still another motor 52, mounted on the compartment floor drives winches 53 from which cables 54 extend over pulleys 55 mounted upon opposite outer upper sides of element 31, the cables then extending downward therefrom and being attached to pins 56 in a lower collar 57 located immediately below upper collar 29. Each of the collars has a circular central opening 58 to receive the shaft therethrough and each collar has radially extending recesses 59 for purpose of clearing pulleys 55 when sliding thereacross. Each of the collars is provided with a keyway 60 which engage a key 61 along the outer side of element 31, thus preventing rotation of the collars and assuring alignment of pulleys 55 with recesses 59. It is to be noted that upper element flange 36 has a plurality of spring actuated pawls 62a which are normally urged outward against underside of collar 29 in one operative position as shown in FIGURE 10.

Canopy 21 is attached to the fuselage by means of shrouds 62. A secondary canopy 63 is attached to the same shrouds between the first canopy and the fuselage. Canopy 21 has a narrow skirt 64 on its periphery whereas canopy 63 has a relatively wide peripheral skirt 65.

In operative use, the device is placed into use by depressing a single button of a control mechanism (not shown). This causes sequential operation of motors each of which performs a different sub-operation. Thus when the button is depressed in case of emergency, the doors 16 are first thrown open and immediately thereafter motor 48 causes the shaft to be raised out of the compartment, the shaft when upright being received within yoke 32 and locked therein by pawls 34a; the motor 48 being then shut off. Immediately thereafter motor 52 causes the lower collar to be raised thus forcing upper collar to travel upward thus causing the framework 20 to expand as shown in FIGURE 4. When the upper collar passes from the lower shaft element 31 to the upper element 30, the motor 52 is shut off. Immediately thereafter motor 47 causes hooks 38 to release hold of upper shaft element 30 thus causing the elements to separate in view that the canopy 21 is already partly inflated and has urged an upward force on element 30. Immediately pawls 62a snap outward preventing upper collar from sliding down again thus keeping canopy open. The airplane due to momentary free weight drops slightly until shrouds are taut, rod extensions 25 at the same time having been forced outwardly causing canopy 21 to fully open as shown in FIGURE 5, at the same time canopy 63 being opened up to share in supporting the aircraft. The entire operation performed in rapid sequence can be accomplished within only a number of seconds. Thus the air plane is supported upon two parachute canopies during a level descent toward earth.

Thus there has been shown a safety parachute device for airplanes that will save human lives and property against air-crashes.

While various changes may be made in the detail construction, it is understood that such changes will be within the spirit and scope of the appended claims.

What I claim as new and desire to secure by Letters Patent is:

1. In an airplane the combination of a fuselage and airfoils, said fuselage having a compartment within the upper portion thereof, said compartment containing in retracted position a parachute device comprising a pair of canopies, said compartment having a pair of upwardly opening doors to permit movement of said parachute device therethrough into an operative position, said parachute device further comprising a shaft supported pivotally free about its one end within said compartment for movement between an inoperative horizontal position within said compartment and an operative vertical position above said fuselage, a plurality of radially extendable rods pivotally attached at their one ends to the upper end of said shaft, said rods supporting one of said canopies, said shaft being comprised of an upper and lower element attached together, means for detaching said shaft elements, said canopy supported on said rods having a plurality of shrouds affixed to the periphery thereof, said shrouds being affixed at their other ends to said fuselage, the other of said canopies being affixed at its periphery to said shrouds between said first canopy and said fuselage, said shaft elements each comprising a hollow tube having a central chamber, the upper of said elements having an inward flange at its lowermost end slidably receivable within the upper end of the lower of said elements, the upper end of said flange having a square shoulder on the inner side of said upper element, a locking mechanism affixed within the lower element chamber, said locking mechanism comprising a plurality of circumferentially spaced apart generally vertical arms attached pivotally free at their lower ends to the wall of said lower chamber, the upper ends of said arms each having a radially outwardly extending hook for engagement over the said square shoulder of said upper element, spring means between said upper ends normally urging said hooks into said engagement over said square shoulder, a link attached pivotally free to each of said vertical arms between the said lower and upper ends, said links extending radially inward within the said chamber, and the radially inwardly converged ends of said links being attached to a common cable extending longitudinally downward through the lower portion of said lower element chamber to a motor-driven winch on said fuselage for selectively pulling said cable when said shaft elements are to be detached.

2. In an airplane the combination as set forth in claim 1 wherein said rods supporting said canopy are each attached to one end of a plurality of connecting rods, the opposite ends of said connecting rods being attached to an upper collar slidable on said shaft elements, a lower collar slidable on the said lower shaft element, said upper and lower collars each having on diametrically opposite sides radially outwardly projecting recesses, a cross pin extending across each of said recesses in said lower collar, a cable attached to each of said crosspins, a pulley affixed near the upper ends and on the outer side of said lower shaft element in alignment with each of said recesses in said upper and lower collars and said cables passing over said pulleys and downward to a motor-driven winch on said fuselage.

References Cited in the file of this patent
UNITED STATES PATENTS

| | | |
|---|---|---|
| 1,433,395 | Marshall | Oct. 24, 1922 |
| 1,731,491 | Grissom et al. | Oct. 15, 1928 |
| 1,890,190 | Papp | Dec. 6, 1932 |
| 2,072,600 | Lewis | Mar. 2, 1937 |
| 2,455,044 | Caplan | Nov. 30, 1948 |